(12) United States Patent
Yuan

(10) Patent No.: US 6,601,765 B2
(45) Date of Patent: Aug. 5, 2003

(54) WATERPROOF STRUCTURE FOR CARD MACHINE

(75) Inventor: Chien Shen Yuan, Hsin-Tien (TW)

(73) Assignee: Unitech Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 09/986,847

(22) Filed: Nov. 13, 2001

(65) Prior Publication Data

US 2003/0089772 A1 May 15, 2003

(51) Int. Cl.[7] .............................................. G06F 17/60
(52) U.S. Cl. ...................................... 235/449; 235/379
(58) Field of Search .............................. 235/449, 379, 235/439, 446, 380, 475, 492, 493; 439/55; 360/75, 1, 2, 101, 77.8

(56) References Cited

U.S. PATENT DOCUMENTS

| | | | | |
|---|---|---|---|---|
| 4,795,896 A | * | 1/1989 | Prell ........................... | 235/482 |
| 5,532,466 A | * | 7/1996 | Konno et al. ................ | 235/441 |
| 5,698,832 A | * | 12/1997 | Someya et al. ............... | 235/38 |
| 5,892,210 A | * | 4/1999 | Levasseur ................... | 235/380 |
| 6,042,010 A | * | 3/2000 | Kanayama et al. .......... | 235/379 |
| 6,176,426 B1 | * | 1/2001 | Kanayama et al. .......... | 235/379 |
| 6,342,982 B1 | * | 1/2002 | Kanayama et al. .......... | 235/449 |
| 6,417,980 B1 | * | 7/2002 | Liu et al. ..................... | 360/101 |

FOREIGN PATENT DOCUMENTS

JP          408292997 A    * 11/1996

* cited by examiner

Primary Examiner—Thien M. Le
(74) Attorney, Agent, or Firm—Rosenberg, Klein & Lee

(57) ABSTRACT

A waterproof structure installed in card machine includes a rigid support and a flexible support. The rigid support, formed of plastics, includes a frame that internally extends into two transversal bars. The transversal bars oppositely connect a receptacle frame located between the transversal bars so that a magnetic head of the card machine can be tightly arranged in the receptacle frame. The flexible support, formed of rubber material, includes a central region where a fixation slot is defined. The fixation slot matches with the receptacle frame to fixedly fasten the magnetic head. An opening is defined in the fixation slot, whereby the magnetic head can connect into a flexible circuit carrier. On upper and lower sides of the fixation slot, a clamping member composed of semi-ringed flanges is arranged around the fixation slot to tightly clamp the transversal bars of the rigid support.

2 Claims, 6 Drawing Sheets

WATERPROOF STRUCTURE FOR CARD MACHINE

BACKGROUND OF THE INVENTION

1. Field of the Invention

The present invention relates to a waterproof structure, and more particularly to a waterproof structure for card machine that can prevent damages of electrical elements of the card machine due to contact with liquid water.

2. Description of the Related Art

Credit cards allow the consumer to acquire a commercial product before effectively paying it, and furthermore the consumer having credit cards at hand does not need to bring to much money cash. Because of its convenience, the use of credit cards is therefore largely accepted. Accordingly, commercial shops are increasingly equipped with card machines to satisfy consumer demands.

However, conventional card machines are not waterproof and are easily damaged if they accidentally contact with liquid water. Water easily penetrates into the card machine and damages the electrical elements thereof. Therefore, conventional card machines present deficient characteristics that can be improved.

SUMMARY OF THE INVENTION

The primary purpose of the present invention is therefore to provide a waterproof structure for card machine that can prevent damages of the electrical elements of the card machine if the card machine contacts with liquid elements.

In accordance with one aspect of the present invention, a waterproof structure installed within a card machine, is composed of a rigid support and a flexible support. The rigid support is made of plastics material, and includes a frame that internally extends into two transversal bars. The transversal bars oppositely connect a receptacle frame located between the transversal bars so that a magnetic head of the card machine can be tightly arranged in the receptacle frame. The flexible support is formed of rubber material, and includes a central region where a fixation slot is defined. The fixation slot matches with the receptacle frame to fixedly fasten the magnetic head. An opening is further defined in the fixation slot, whereby the magnetic head can connect through the opening into a flexible circuit carrier to transmit signals. On an upper and lower side of the fixation slot, a clamping member composed of semi-ringed flanges is further arranged around the fixation slot to tightly clamp the transversal bars of the rigid support. Thereby, the rigid support can be tightly attached with the flexible support to prevent liquid penetration.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention and, incorporated herein, constitute a part of the invention disclosure. A brief introduction of the drawings is as follows.

DESCRIPTION OF THE PREFERRED EMBODIMENTS

Figure 1:
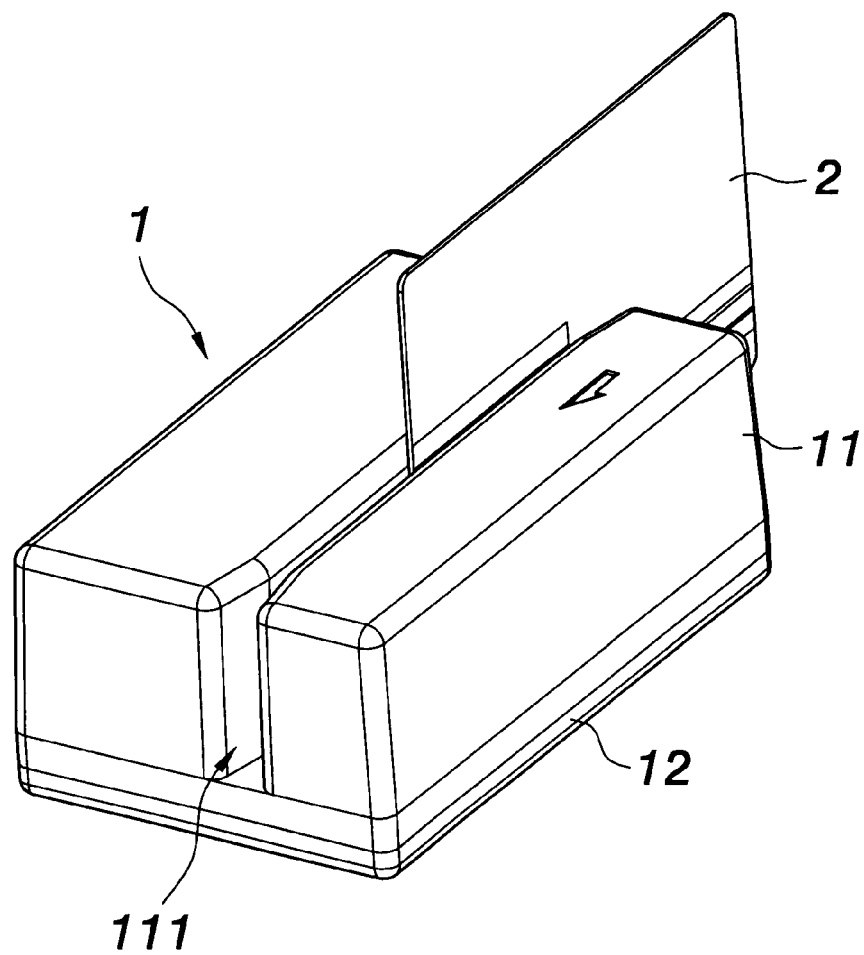
FIG. 1 is a general perspective view of a conventional card machine.

The following detailed description of the invention with reference to the accompanying drawings is only illustrative of specific structures and ways of making the invention, and does not limit the scope of the invention. Wherever possible in the description, like reference numerals will refer to like elements and parts unless otherwise illustrated.

Referring now to FIG. 1 through FIG. 6, various views illustrate a waterproof structure for card machine according to an embodiment of the invention. As shown in FIG. 1, the waterproof structure of the invention, arranged on a card machine 1, externally comprises an upper cover 11 and a lower cover 12 that assemble with each other. A card slot 111 is arranged in the upper cover 11 through which a magnetic card 2 can be passed through.

Figure 2:
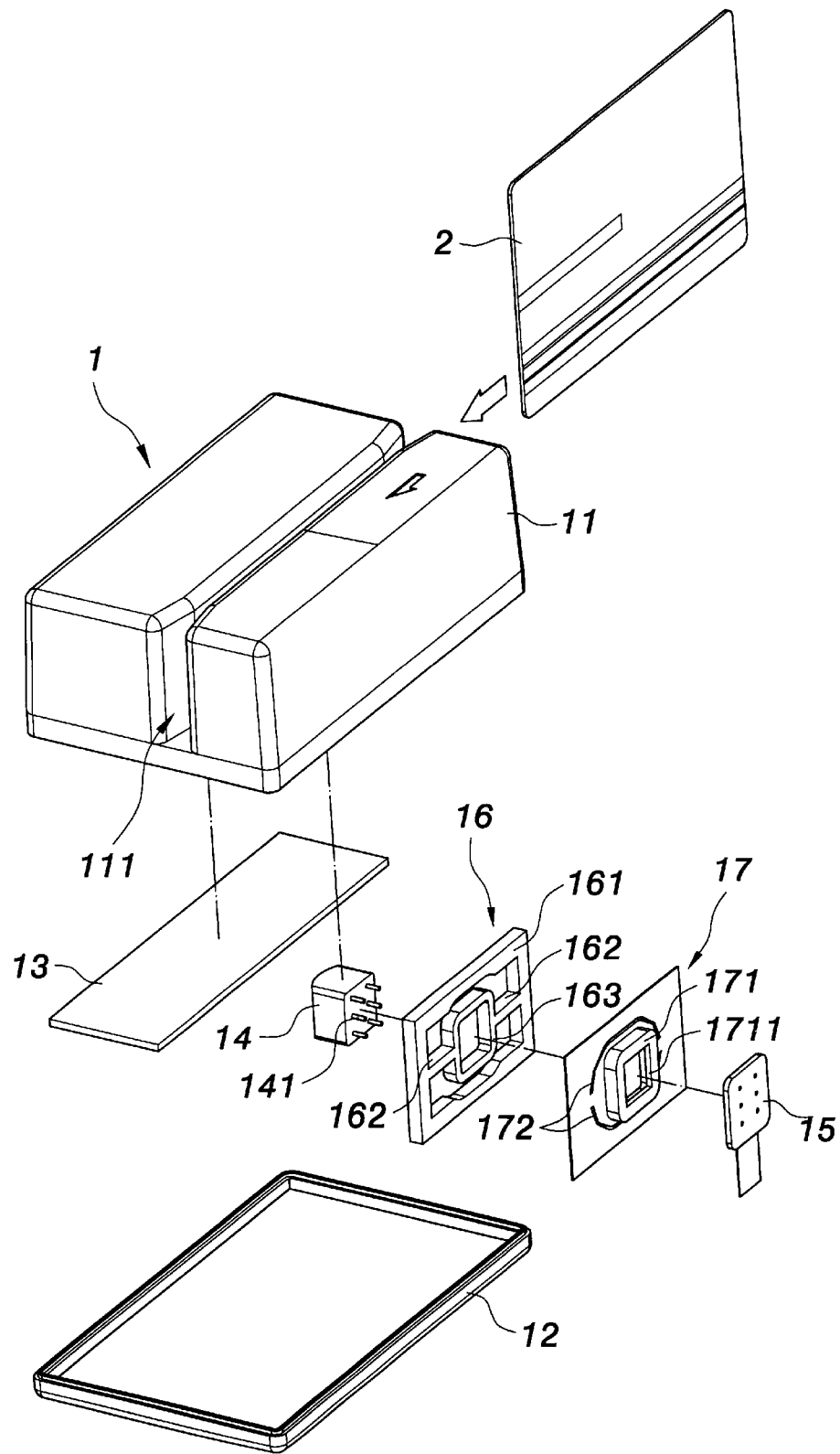
FIG. 2 is a perspective and exploded view of a card machine according to an embodiment of the invention.
Figure 3:
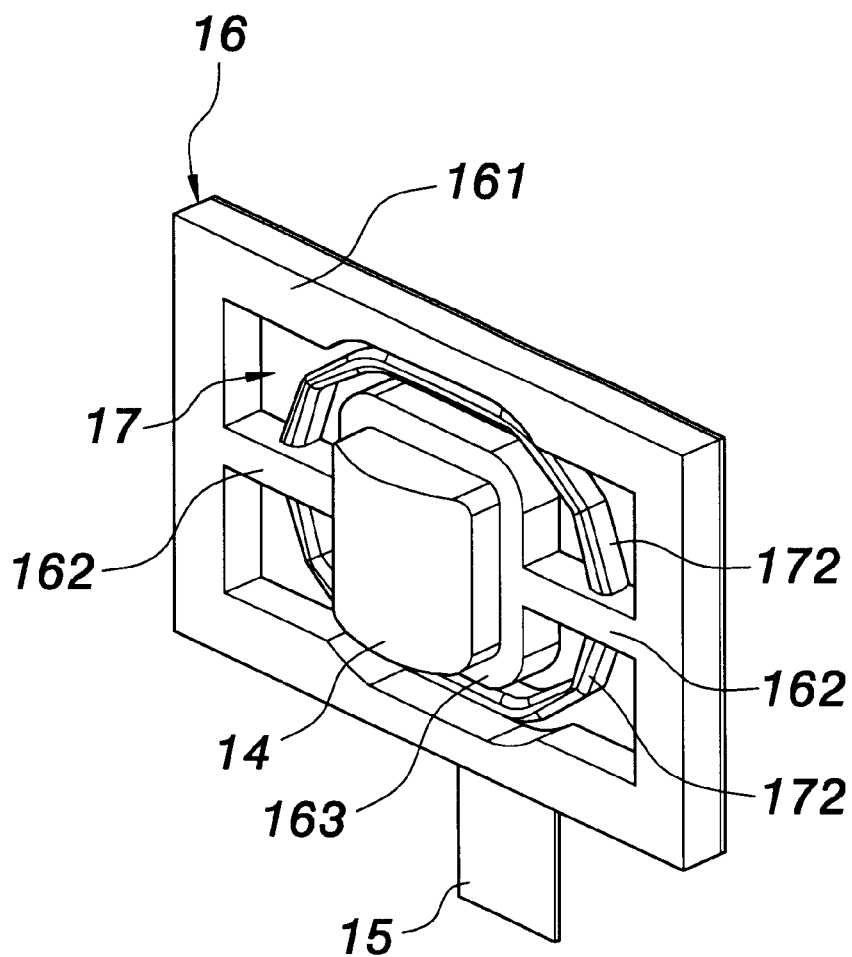
FIG. 3 is an enlarged perspective view particularly showing a magnetic head assembled with a waterproof structure according to an embodiment of the invention.

As shown in FIG. 2, the upper cover 11 includes a decoder circuit board 13, a magnetic head 14, and a flexible circuit carrier 15 that assemble with one another. The waterproof structure of the invention is mounted between the magnetic head 13 and the flexible circuit carrier 15. The waterproof structure includes a rigid support 16 and a flexible support 17. The rigid support 16 is formed of rigid plastics, and includes a rectangular frame 161. The frame 161 internally extends into two transversal bars 162 that are located respectively at a right and left internal side of the frame 161. Between the two transversal bars 162, a receptacle frame 163 oppositely connects each of the two transversal bars 162. As shown in FIG. 3, the size and the shape of the receptacle frame 163 are adapted to the size and the shape of the magnetic head 14 of the card machine 1 so that the magnetic head 14 can be constrictively arranged within the receptacle frame 163. The transversal bars 162 and the receptacle frame 163 hence prevent any left-right rotation of the magnetic head 14 that is thereby fixedly positioned.

Figure 5:
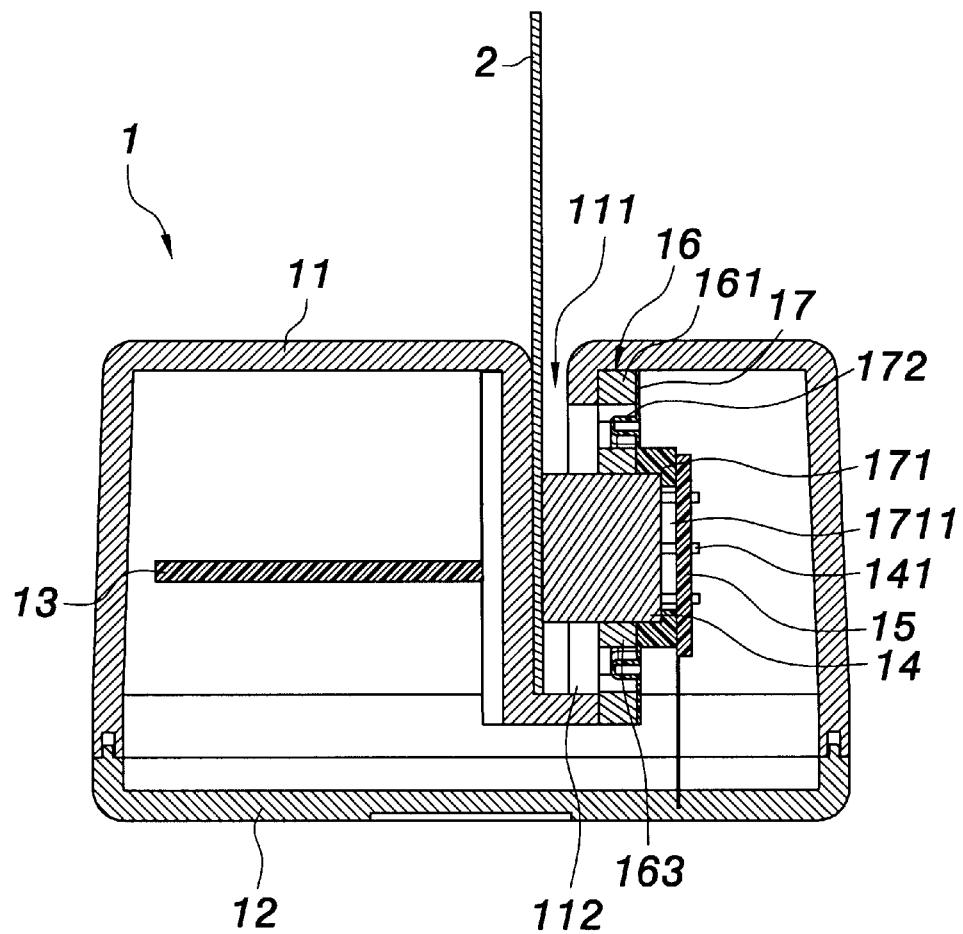
FIG. 5 is a cross-sectional view taken along the section 5—5 of FIG. 4.

The flexible support 17 is a film made of flexible rubber that has resilience characteristic and is waterproof so as to prevent liquid penetration from the front and the rear of the magnetic head 14. The flexible support 17 has at a central region in which a fixation slot 171 is defined. The fixation slot 171 has a shape and a size that are adapted to the shape and the size of the magnetic head 14, and further matches with the receptacle frame 163 to fixedly fasten the magnetic head 14. An opening 1711 that is slightly smaller than the size of the magnetic head 14 is defined in the fixation slot 171. As shown in FIG. 5, metallic connectors 141 on the rear side of the magnetic head 14 can thereby extend through the opening 1711 to electrically connect into the flexible circuit carrier 15.

Figure 4:
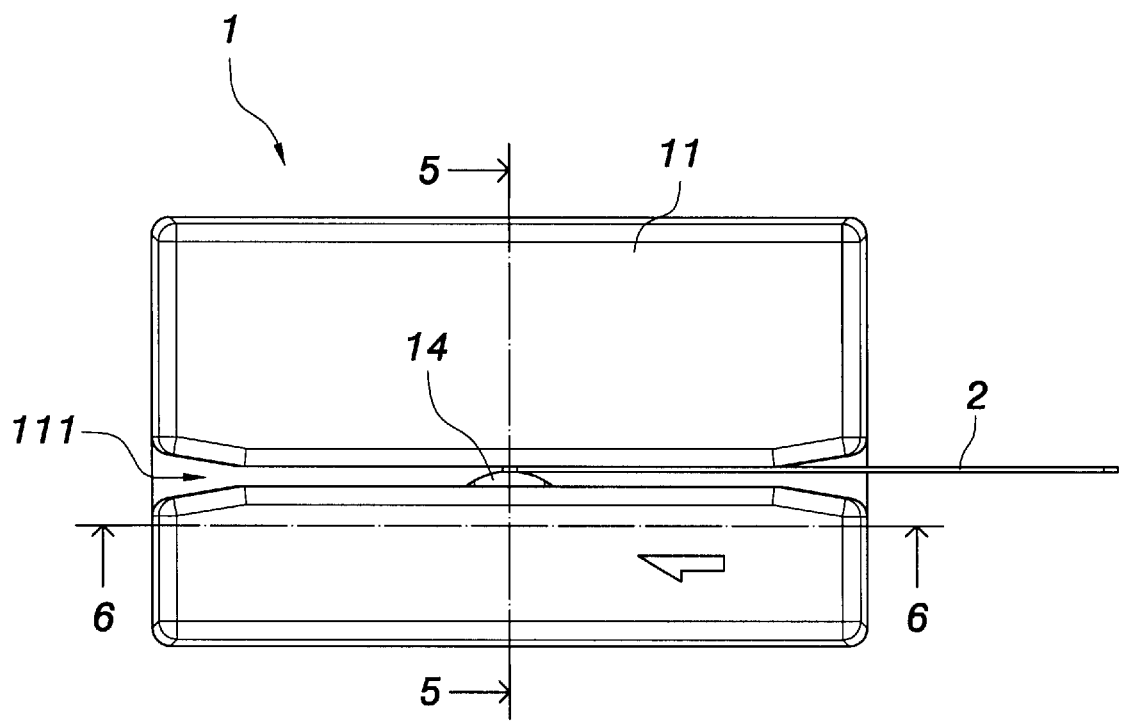
FIG. 4 is a perspective top view of a card machine according to an embodiment of the invention.
Figure 6:
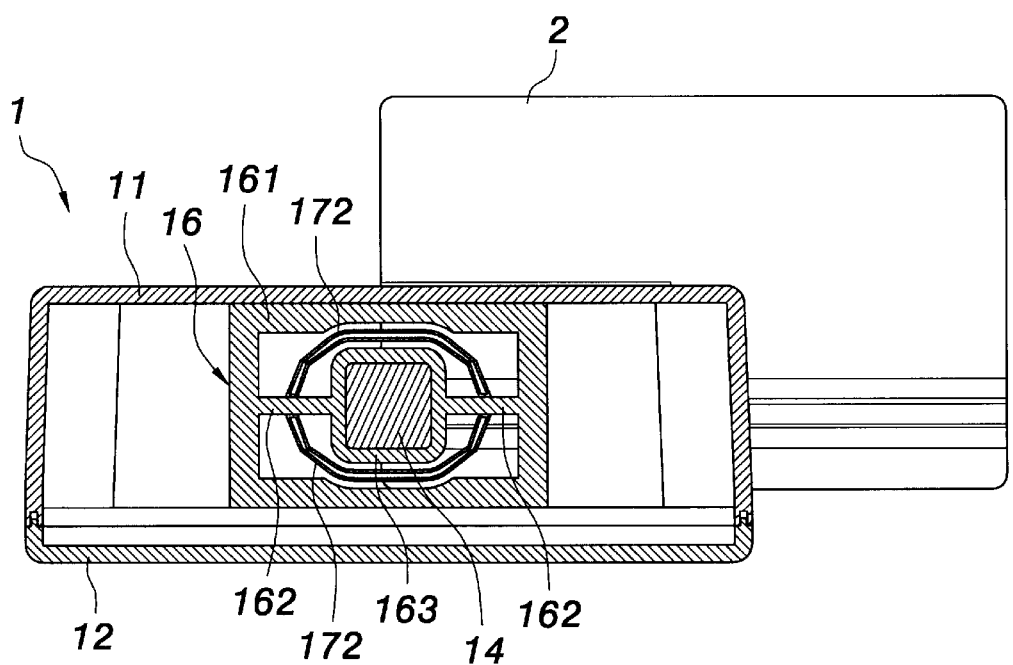
FIG. 6 is a cross-sectional view taken along the section 6—6 of FIG. 4.

With reference to FIG. 3, FIG. 5, and FIG. 6, on an upper and lower side of the fixation slot 171, a clamping member 172 that is composed of two semi-ringed flanges is arranged around the fixation slot 171. The clamping member 172 is placed on a surface of the flexible support 17 that is opposite to the surface of the flexible support 17 from which the fixation slot 171 is defined. To obtain effective waterproofing, the flexible support 17 is directly formed in the rigid support 16 so that both rigid support 16 and flexible support 17 are integrated into a single body without seams there between. In addition, the transversal bars 162 tightly assemble within the clearances between the two elements of the clamping member 172 that are designed slightly smaller than the thickness of the transversal bars 162. The clamping member 172, by resilience, can thereby pinch the inserted transversal bars 162 to improve tight attachment of the rigid support 16 with the flexible support 17 and, consequently, waterproofing characteristic is improved. Referring to FIG. 4 through FIG. 6, once the rigid support 16 is tightly attached to the flexible support 17, the receptacle frame 163 of the rigid support 16 is aligned with the fixation slot 171 of the flexible support 17. An arrangement space for the magnetic head 14 is thereby defined through the receptacle frame 163 and the fixation slot 171. As shown in FIG. 5, the magnetic head 14 assembles into the hence-formed arrangement space with metallic connectors 141 thereof extending out of the opening 1711 of the fixation slot 171 to connect into the flexible circuit carrier 15. Signals can be thereby transferred from and to the magnetic head 14.

As shown in FIG. 5, an opening 112 is arranged on a sidewall of the card slot 111 of the upper cover 11. With the magnetic head 14 assembled within the rigid support 16, the rigid support 16 is fixedly attached by adhesion onto an internal sidewall of the upper cover 11 proximate to the opening 112 so that the front of the magnetic head 14 can protrude through the opening 112. The lower cover 12 then assembles with the upper cover 11 to form the card machine 1. When a magnetic card 2 is passed through the card slot 111 of the upper cover 11, the magnetic head 14 hence can read out data stored in the magnetic card 2. With the metallic connectors 141 of the magnetic head 14 connected into the flexible circuit carrier 15 that, as shown in FIG. 5, covers over the flexible support 17, the metallic connectors 141 can be therefore protected from damages due to contact with liquid droplets accidentally sputtered.

The above description reveals that the waterproof structure of the invention, by including a flexible support that is a film made of rubber material having waterproofing characteristic, can protect the electrical elements of the card machine from damages due to contact with liquids. Via resilience of the flexible support, the flanges of the clamping member can tightly pinch the transversal bars of the rigid support to improve tight attachment of the flexible support with the rigid support. Furthermore, by including a receptacle frame and thereto-connected transversal bars, the rigid support can tightly constrict and immobilize the magnetic head placed in the receptacle frame. Waterproofing can be thereby improved.

In conclusion, the invention provides an improvement of the known card machine that is conventionally not waterproof and, therefore, is easily damaged by accidental contacts of the electrical elements thereof with liquids. With the waterproof structure of the invention installed in the card machine, conventional failures due to liquid exposure can be therefore advantageously overcome.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A waterproof structure for a card machine that includes a magnetic head and a flexible circuit carrier into which the magnetic head connects, the waterproof structure comprising:

a rigid support formed of a plastics material, the rigid support frame having a frame that internally extends into two transversal bars; the transversal bars oppositely connected to a receptacle frame located there between, so that the magnetic head of the card machine is tightly arranged in the receptacle frame; and, a flexible support formed of a rubber material engaging the rigid support, the flexible support having a central portion in which is defined a fixation slot aligned with the receptacle frame to fixedly fasten the magnetic head; the fixation slot having a central opening, so that the magnetic head is connected into the flexible circuit carrier to transmit signals; and the flexible support having an outer portion extending outward from said central portion, the outer portion having a plurality of protuberant clamping members disposed about the central portion, the clamping members being angularly spaced one from the other, adjacent ones of the clamping members being disposed to resiliently clamp there between at least one of the transversal bars of the rigid support; thereby reinforcing a tight attachment of the rigid support about the magnetic head to prevent liquid penetration.

2. The waterproof structure of claim 1, wherein the rigid support is fixedly attached by adhesion to an upper frame of the card machine.

* * * * *